(12) United States Patent
Guzikevits

(10) Patent No.: US 7,545,796 B2
(45) Date of Patent: Jun. 9, 2009

(54) SHARED MEDIUM CA/CSMA ROBUSTNESS

(75) Inventor: Zuri Guzikevits, Tel-Aviv (IL)

(73) Assignee: Coppergate Communications Ltd., Tel Aviv (IL)

( * ) Notice: Subject to any disclaimer, the term of this patent is extended or adjusted under 35 U.S.C. 154(b) by 323 days.

(21) Appl. No.: 11/375,566

(22) Filed: Mar. 15, 2006

(65) Prior Publication Data

US 2007/0217449 A1 Sep. 20, 2007

(51) Int. Cl.
H04J 3/06 (2006.01)
(52) U.S. Cl. ........................ 370/350; 370/508
(58) Field of Classification Search ........... 370/468, 370/350, 508
See application file for complete search history.

(56) References Cited

U.S. PATENT DOCUMENTS 6,467,003 B1 * 10/2002 Doerenberg et al. ........ 710/117
2002/0044763 A1 * 4/2002 Wehmeyer et al. ............ 386/83
2004/0179836 A1 * 9/2004 Yamaguchi et al. ............ 398/5
2005/0132060 A1 * 6/2005 Mo et al. ..................... 709/227

OTHER PUBLICATIONS

U.S. Appl. No. 11/000,524, Baum et al.
U.S. Appl. No. 11/218,708, Sterenson et al.

* cited by examiner

Primary Examiner—Seema S Rao
Assistant Examiner—Sai-Ming Chan
(74) Attorney, Agent, or Firm—AlphaPatent Associates Ltd.; Daniel J. Swirsky (57) ABSTRACT

A method includes providing transmission opportunity synchronization information from a transmitting network device to other network devices attempting to follow the same transmission opportunities schedule as the transmitting network device. A network device includes a transceiver to transmit and receive transmission opportunity synchronization information, and a unit to utilize transmission opportunity synchronization information received from another network device to adhere to the same transmission opportunity schedule as the other network device.

7 Claims, 6 Drawing Sheets

SHARED MEDIUM CA/CSMA ROBUSTNESS

FIELD OF THE INVENTION

The present invention relates to data networks generally and to media access allocation in data networks in particular.

BACKGROUND OF THE INVENTION

There are many different types of data networks, of which Ethernet is perhaps the best known. Some data networks have resource reservation schemes. One such network is Home-PNA (Home Phoneline Network Alliance) v3.0, which is designed to work over existing telephone lines to create a home/small office network. U.S. patent application Ser. No. 11/000,524, filed Dec. 1, 2004 and assigned to the common assignee of the present invention, describes generally how to extend the HomePNA v3.0 standard to operate over a hybrid network of telephone and coax lines.

HomePNA v0.3 and other such resource reservation networks have a scheduler, described herein below, to guarantee media resources to network devices, to prevent collision between multiple network devices using the same line and to ensure quality of service. In coax networks, preventive collision detection limits the dynamic range of the network devices, which may impose physical limitations on the size of the network, so it is preferable to use collision avoidance methods for media access in coax networks.

Such a collision avoidance method is disclosed in U.S. patent application Ser. No. 11/218,708 entitled 'Collision Avoidance Media Access Method for Shared Networks', filed Sep. 6, 2005 and assigned to the common assignee of the present invention. This application is incorporated herein by reference. The collision avoidance/carrier sensing media access (CA/CSMA) method disclosed in the application employs a media access plan (MAP) having sub-burst slots. Each sub-burst slot has a shorter duration than a minimal transmission burst duration (e.g., 8-32 μsecs), is associated with a particular one or group of network participants, and represents an opportunity for the initiation of a data transmission by its associated network participants.

Figure 1A:
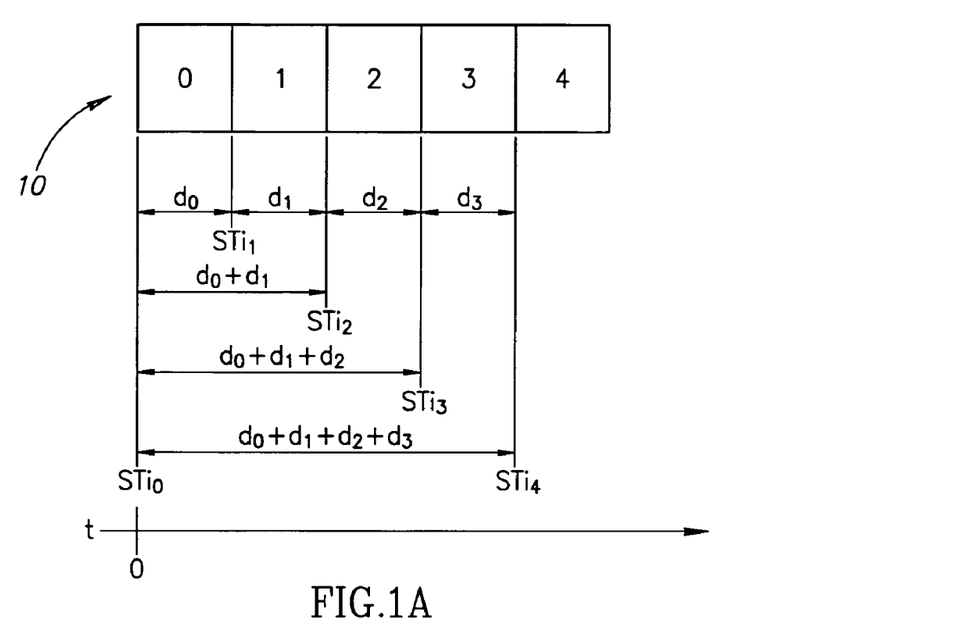
FIG. 1A is an illustration of a schedule of sub-burst slots according to an exemplary media access plan (MAP) operative in a network employing a collision avoidance/carrier sensing media access (CA/CSMA) method.

The MAP for a transmission cycle dictates a schedule of sub-burst slots, wherein numbered sub-burst slots are scheduled in a particular order. FIG. 1A, reference to which is now made, shows an exemplary sub-burst slot schedule 10, in which five sub-burst slots numbered 0 through 4 are scheduled in sequential order. Sub-burst slot schedule 10 may also be seen as a grid of transmission opportunity start times. The start time $ST_N$ for each sub-burst slot N is the moment at which the network participant associated with sub-burst slot N may begin to transmit.

In the initial grid of transmission opportunity start times (before any transmissions occur), the start time of each sub-burst slot N, $ST_N$, occurs after the sum of the durations of the sub-burst slots preceding sub-burst slot N. For example, as shown in FIG. 1A, the initial start times $STi_0$, $STi_1$, $STi_2$, $STi_3$, and $STi_4$ of sub-burst slots 0-4 respectively, occur at (t=0), (t=$d_0$), (t=$d_0+d_1$), (t=$d_0+d_1+d_2$), and (t=$d_0+d_1+d_2+d_3$) respectively, where $d_0$, $d_1$, $d_2$, and $d_3$ are the durations of sub-burst slots 0-4 respectively.

The principal advantage of sub-burst slots over regular sized time slots is that when a network participant does not use its transmission opportunity, minimal time is wasted before the opportunity to transmit is passed to the next network participant in the queue. On the other hand, when a network participant opts to transmit when its turn arrives, the allowable transmission duration is not limited by the short duration of the sub-burst slot. Rather, the sub-burst slot expands to encompass the required transmission burst duration. Accordingly, the start times of the succeeding sub-burst slots are delayed by an amount of time equal to the portion of the transmission duration which exceeds the original sub-burst slot duration. In effect, the entire grid of transmission opportunity start times shifts by this amount.

Figure 1B:
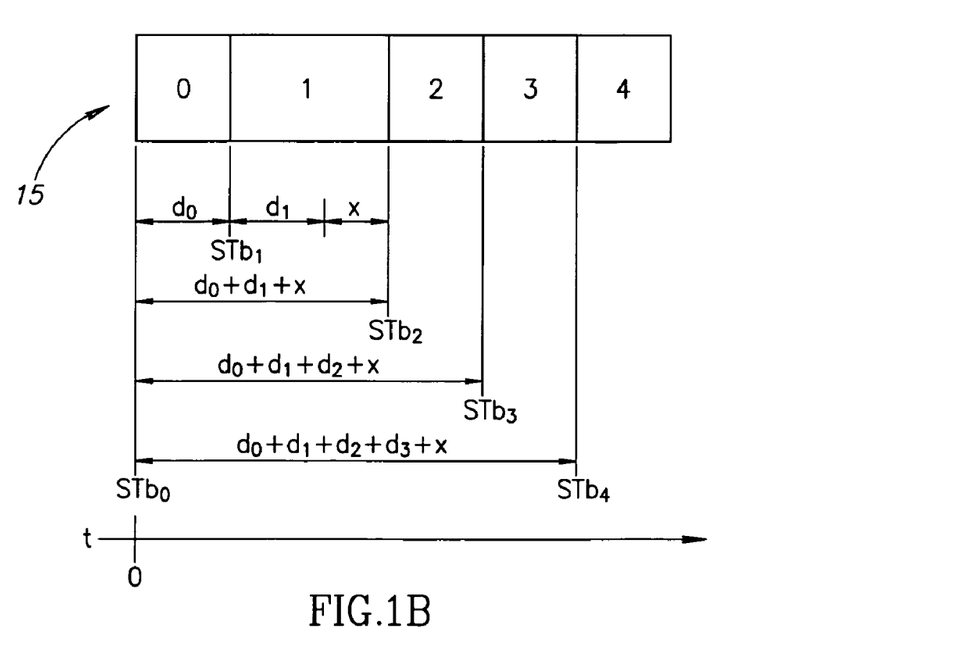
FIG. 1B is a timing diagram illustration for an exemplary transmission cycle for the schedule of FIG. 1.

For example, as shown in FIG. 1B, reference to which is now made, timing diagram 15 for an exemplary transmission cycle operating in accordance with sub-burst slot schedule 10 shows how a transmission during sub-burst slot '1' alters the initial grid of transmission opportunity start times for the sub-burst slots following sub-burst slot '1'. As shown in FIG. 1B, start times $STb_2$, $STb_3$ and $STb_4$ are incremented by x, the portion of the transmission transmitted during sub-burst slot '1' which exceeds the original sub-burst slot duration $d_1$.

In a network employing the CA/CSMA method described hereinabove, all of the participating network nodes receive the MAP and extract from it their relative transmission opportunities. Then they employ carrier sensing to monitor transmissions occurring over the network so that, subsequent to each transmission, they can synchronize to an updated transmission opportunities schedule accounting for transmission-induced shifts in the sub-burst slot start time grid.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Applicant has realized that successful operation of the shared medium collision avoidance/carrier sensing media access (CA/CSMA) method described in the Background is highly dependent on accurate carrier sensing on the part of the network nodes participating in a transmission cycle. That is, for optimal operation, the carrier sensors in all of the network nodes must receive the same information regarding transmissions occurring over the network. This guarantees synchronization of all nodes to the same timing and transmission opportunities schedule as described in the Background.

If however, not all of the network nodes correctly sense a transmission over the network, (due to intermittent noise, for example) then the nodes which do not sense the transmission may lose network synchronization. In another scenario, loss of synchronization may occur when noise on the line is incorrectly interpreted by a node as a valid data transmission. An unsynchronized node may then mistakenly identify a transmission opportunity associated with a different node as its own opportunity to transmit, and collisions may occur, increasing the packet error rate (PER). This undesirable situation could continue for a relatively long period of time until a new media access plan (MAP) is publicized and the network nodes are resynchronized.

Figure 2:
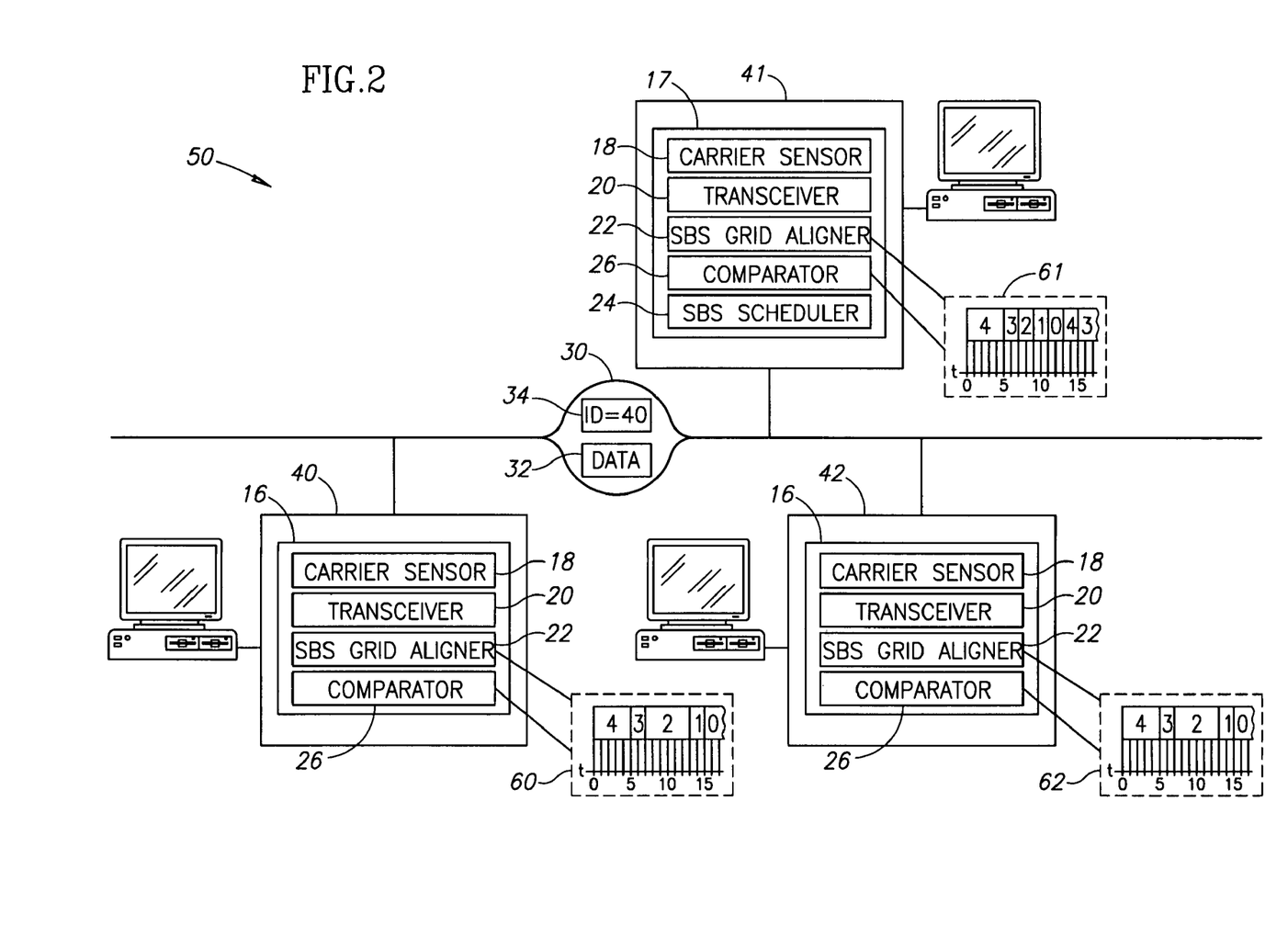
FIG. 2 is a schematic illustration of an exemplary data network, constructed and operative in accordance with a preferred embodiment of the present invention.

Reference is now made to FIG. 2 which shows an exemplary network 50 over which the shared medium CA/CSMA method may be operational. As shown in FIG. 2, network 50 comprises three network devices 40, 41 and 42, connected to computers. Network 50 also comprises network devices 43 and 44, which are similar in configuration to network devices 40 and 42, and which are not shown in FIG. 2 for the sake of clarity.

Network devices 40 and 42 each comprise a modem 16 which includes a carrier sensor 18, a transceiver 20, a sub-burst slot (SBS) grid aligner 22 and a comparator 26. Network device 41 comprises a modem 17 which includes a carrier sensor 18, a transceiver 20, an SBS grid aligner 22, a comparator 26 and a sub-burst slot (SBS) scheduler 24. SBS scheduler 24 creates and sends a MAP to each device on network 50 at the beginning of each transmission cycle. Transceivers 20 either transmit, receive, or both transmit and receive data transmissions transmitted over network 50. Carrier sensors 18 sense whether the network medium is occupied by a transmitting network device. SBS grid aligners 22 synchronize the network devices to an updated transmission schedule which includes the transmission-induced shifts in the transmission opportunities grid as sensed by carrier sensors 18. Comparators 26 compare the transmission schedules calculated by SBS grid aligners 22 with transmitting node information transmitted in accordance with the present invention, which will be discussed later in further detail.

In the present invention, the robustness of the shared medium CA/CSMA method may be enhanced by providing a system and a method for limiting packet errors due to loss of synchronization occurring when carrier sensing in a network node errs in recognizing a transmission. Transmission recognition errors may include both failures to recognize a valid transmission when one occurs, as well as errors caused by recognizing a valid transmission when one does not actually occur. In one preferred embodiment of the present invention, the occurrences of synchronization loss may be minimized through the publication of transmitting node ID information over the network during transmissions as described in further detail with respect to FIG. 2.

In accordance with a preferred embodiment of the present invention, each transmission burst by the transceiver 20 of a network device may contain, in addition to its payload data packet, explicit information about the transmitting node ID. In the example shown in FIG. 2, network device 40 transmits transmission burst 30, which comprises a payload data packet 32 and transmitting node ID information 34. Transmission node ID information 34 identifies network device 40 as the node responsible for transmitting transmission burst 30 over network 50.

During a transmission, the 'listening' nodes on network 50 may, using carrier sensors 18, detect that a transmission is occurring, and may also, in accordance with a preferred embodiment of the present invention, identify the transmitting node by acquiring transmitting node ID information 34. The listening nodes may be defined as all nodes participating in a transmission cycle and not transmitting at a given time. While not transmitting, listening nodes may employ carrier sensing to listen for transmissions occurring over the network.

In accordance with the present invention, upon receipt of transmitting node ID information 34, the listening nodes may activate an algorithm that may reduce desynchronization events to a minimum, thereby reducing transmission errors.

In one embodiment of the present invention, the desynchronization reduction algorithm may dictate that comparator 26 of each listening node compare the transmitting node ID information 34 received during a transmission with the current transmission opportunity schedule calculated by SBS grid aligner 22. If, during a transmission by a transmitting node at $t = t_k$, comparator 26 ascertains that the transmitting node ID information 34 matches the node ID associated with the sub-burst slot scheduled for a transmission opportunity at $t=t_k$ according to the current transmission opportunity schedule, then the listening node determining the match may confirm that it is synchronized with the transmitting node. All listening nodes confirming their synchronization with the one transmitting node transmitting at a given time may effectively confirm their synchronization with each other at that time. On the other hand, if a listening node discovers a mismatch between the transmitting node ID and the node it expected to be transmitting at that time, it may confirm that it is out of sync with the transmitting node.

Listening nodes confirming that they are out of sync with the transmitting node may not transmit until a later synchronization check confirms synchronization. An unsynchronized listening node is thus prevented from transmitting according to an unsynchronized sub-burst slot schedule and risking a collision.

Returning now to FIG. 2, reference is made to transmission opportunity schedules 60, 61 and 62, which are the transmission opportunity schedules calculated by SBS grid aligners 22 for network devices 40, 41 and 42 respectively. The sequences of sub-burst slots shown in transmission opportunity schedules 60, 61 and 62 indicate that the MAP for the exemplary transmission cycle of FIG. 2 dictates the decremental scheduling of sub-burst slots 0 through 4, i.e. '4, 3, 2, 1, 0'. It is further shown in transmission opportunity schedule 61, in which the sub-burst slot sequence shown is '4, 3, 2, 1, 0, 4, 3' that the MAP for the transmission cycle further dictates that after one cycle of the sequence '4, 3, 2, 1, 0', the sequence is repeated. In the example shown in FIG. 2, sub-burst slots 0, 1, 2, 3 and 4 are associated with network devices 40, 41, 42, 43, and 44 respectively.

It will be appreciated that FIG. 2 illustrates an exemplary transmission cycle at a particular moment t in time. In the example shown in FIG. 2, t=15. As may be seen in FIG. 2, each of schedules 60, 61 and 62 show transmission activity as perceived by the carrier sensors 18 of network devices 40, 41 and 42 respectively for t=0 through t=15. After t=15, each of schedules 60, 61 and 62 indicate a schedule of future transmission opportunities, beginning with the network node which has the exclusive opportunity to transmit at t=15.

Transmission opportunity schedules 60 and 62 show that carrier sensors 18 of network devices 40 and 42 respectively, perceived identical transmission activity over the network from t=0 until t=15. Specifically, schedules 60 and 62 show that network device 44 transmitted from t=0 until t=5, that network device 43 passed on its sub-burst slot transmission opportunity at t=5, that network device 42 transmitted from t=7 until t=13, and that network device 41 passed on its sub-burst slot transmission opportunity at t=13.

At t=15 network device 40 transmits transmission burst 30 during its scheduled sub-burst slot '0'. Network device 42 perceives a transmission over network 50 using carrier sensor 18, and in accordance with the present invention, comparator 26 of network device 42 compares transmitting node ID information 34 with current transmission opportunity schedule 62. Because transmitting node ID information 34 indicates network device 40, and the sub-burst slot '0' scheduled on current transmission opportunity schedule 62 is associated with network device 40, network device 42 confirms a match between the transmitting device and the device scheduled to transmit, thereby confirming its synchronization with the transmitting device.

It is further shown in FIG. 2 that for network device 41, a comparison between transmitting node ID information 34 and the sub-burst slot '3' scheduled in current transmission opportunity schedule 61 at t=15 indicates a mismatch between the transmitting device 40 and device 43 scheduled to transmit in association with sub-burst slot '3'. In accordance with the present invention, network device 41 may accordingly register that it is out of sync with the transmitting node and that it may not transmit data until a subsequent synchronization check confirms synchronization. This may occur, for example, subsequent to the publication of the next MAP by SBS scheduler 24.

The cause for the lack of synchronization of network device 41 may be seen in transmission opportunity schedule 61. Between t=7 and t=13 network device 42 transmitted during sub-burst slot '2', as may be seen in transmission opportunity schedules 60 and 62. However, it may be seen in transmission opportunity schedule 61 that this transmission was not detected by carrier sensor 18 of network device 41, and that the shift in the transmission opportunity start times grid which was incorporated by SBS grid aligners 22 of network devices 40 and 42 in transmission opportunity schedules 60 and 62 respectively, was not incorporated by SBS grid aligner 22 of network device 41 in transmission opportunity schedule 61.

It will be further appreciated that in a transmission recognition error scenario in which a noise on the line is mistaken by a network node for a valid transmission, the requirement of the present invention that a valid transmitter ID be recognized along with a data transmission may decrease the likelihood of this type of error occurring.

Figure 3:
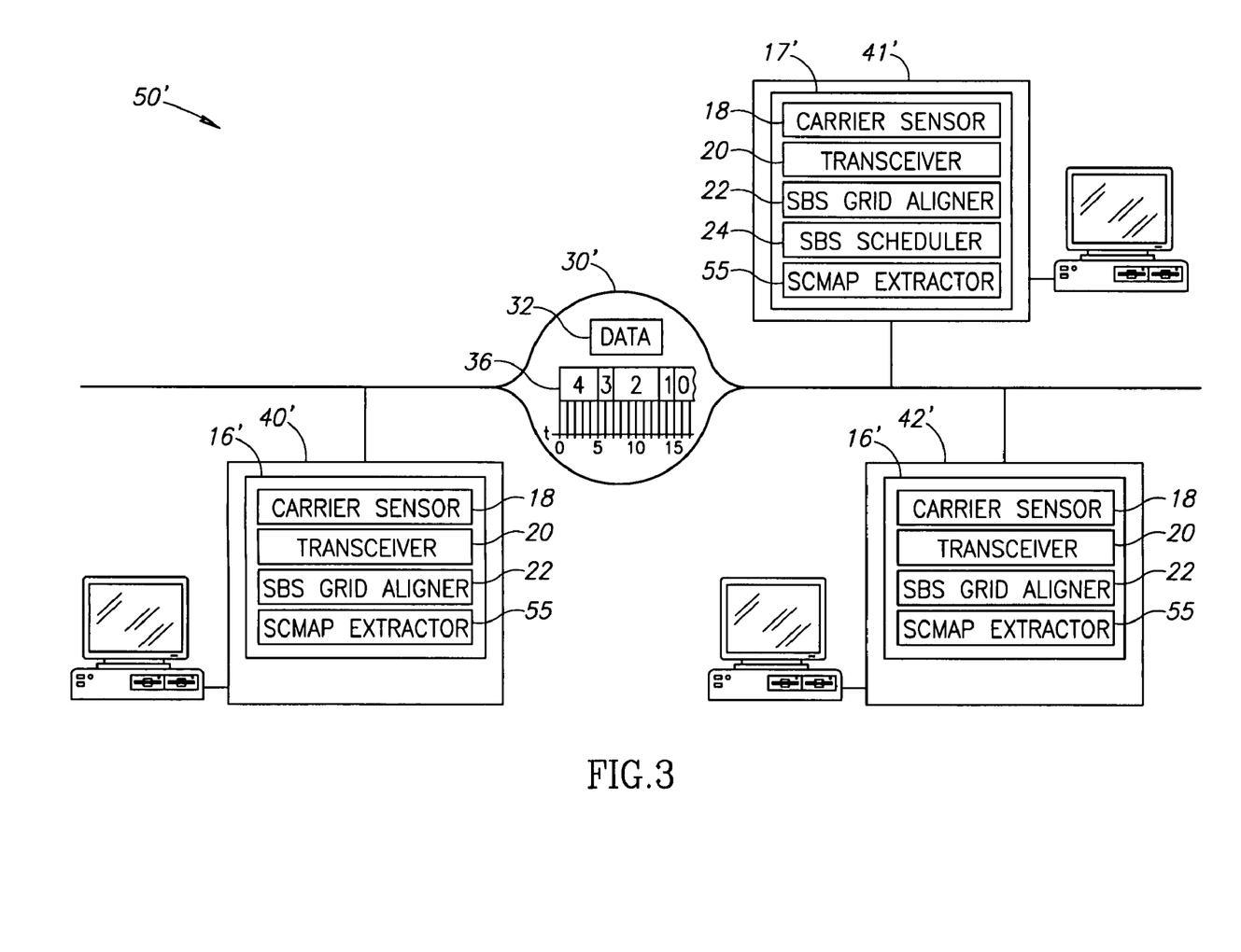
FIG. 3 is a schematic illustration of an alternative data network similar to the data network shown in FIG. 2, constructed and operative in accordance with an additional preferred embodiment of the present invention.

An additional preferred embodiment of the present invention is shown in FIG. 3, reference to which is now made. FIG. 3 shows an exemplary network 50' which is similar to network 50 of FIG. 2. Network 50' comprises network devices 40', 41', 42', 43' and 44' which are similar to network devices 40, 41, 42, 43 and 44 respectively of network 50. As in network 50 shown in FIG. 2, network devices 40', 41' and 42' are shown in FIG. 3, while network devices 43' and 44' are not shown in FIG. 3 for the sake of clarity.

Like network devices 40 and 42 which each comprise a modem 16, network devices 40' and 42' each comprise a modem 16' which is similar to modem 16 of FIG. 2. Both modems 16 (FIG. 2) and 16' (FIG. 3) comprise a carrier sensor 18, a transceiver 20, and a sub-burst slot (SBS) grid aligner 22. However, while modem 16 (FIG. 2) comprises a comparator 26, modem 16' (FIG. 3) comprises an SCMAP extractor 55. Similarly, modem 17' of network device 41' (FIG. 3) comprises an SCMAP extractor 55, while modem 17 of network device 41 (FIG. 2) comprises a comparator 26. The operation of carrier sensors 18, transceivers 20, and sub-burst slot (SBS) grid aligners 22 in modems 16' and 17', and the operation of sub-burst slot (SBS) scheduler 24 in modem 17' are similar to their operation in modems 16 and 17 as described in FIG. 2.

In the embodiment of the present invention shown in FIG. 3, each transmission burst by the transceiver 20 of a network device may contain, in addition to its payload data packet, a self-calculated MAP (SCMAP). The SCMAP may be the transmission opportunity schedule calculated by the SBS grid aligner 22 of the transmitting network device, such as transmission opportunity schedules 60, 61 and 62 shown in FIG. 2.

In the example shown in FIG. 3, the transmission burst 30' transmitted by network device 40' comprises a payload data packet 32 similar to payload data packet 32 of FIG. 2, and an SCMAP 36. SCMAP 36 is shown to comprise transmission opportunity schedule 60 (FIG. 2) calculated by SBS grid aligner 22 of network device 40.

As presented previously with respect to FIG. 2, in the additional preferred embodiment of the present invention shown in FIG. 3, the listening nodes on network 50' may use carrier sensors 18 to detect that a transmission is occurring over network 50'. However, in accordance with the additional preferred embodiment of the present invention shown in FIG. 3, in order to minimize desynchronization events and their concomitant packet errors, the listening nodes may extract SCMAP 36 and proceed to use it as the current transmission opportunities schedule. All network nodes may then use SCMAP 36 and may thus be synchronized in their shared use of the same transmission opportunities schedule, SCMAP 36. All of the network nodes may continue to use SCMAP 36 until a different SCMAP is transmitted by a transmitting node, or a new MAP is publicized over the network by SBS scheduler 24.

Figure 4:
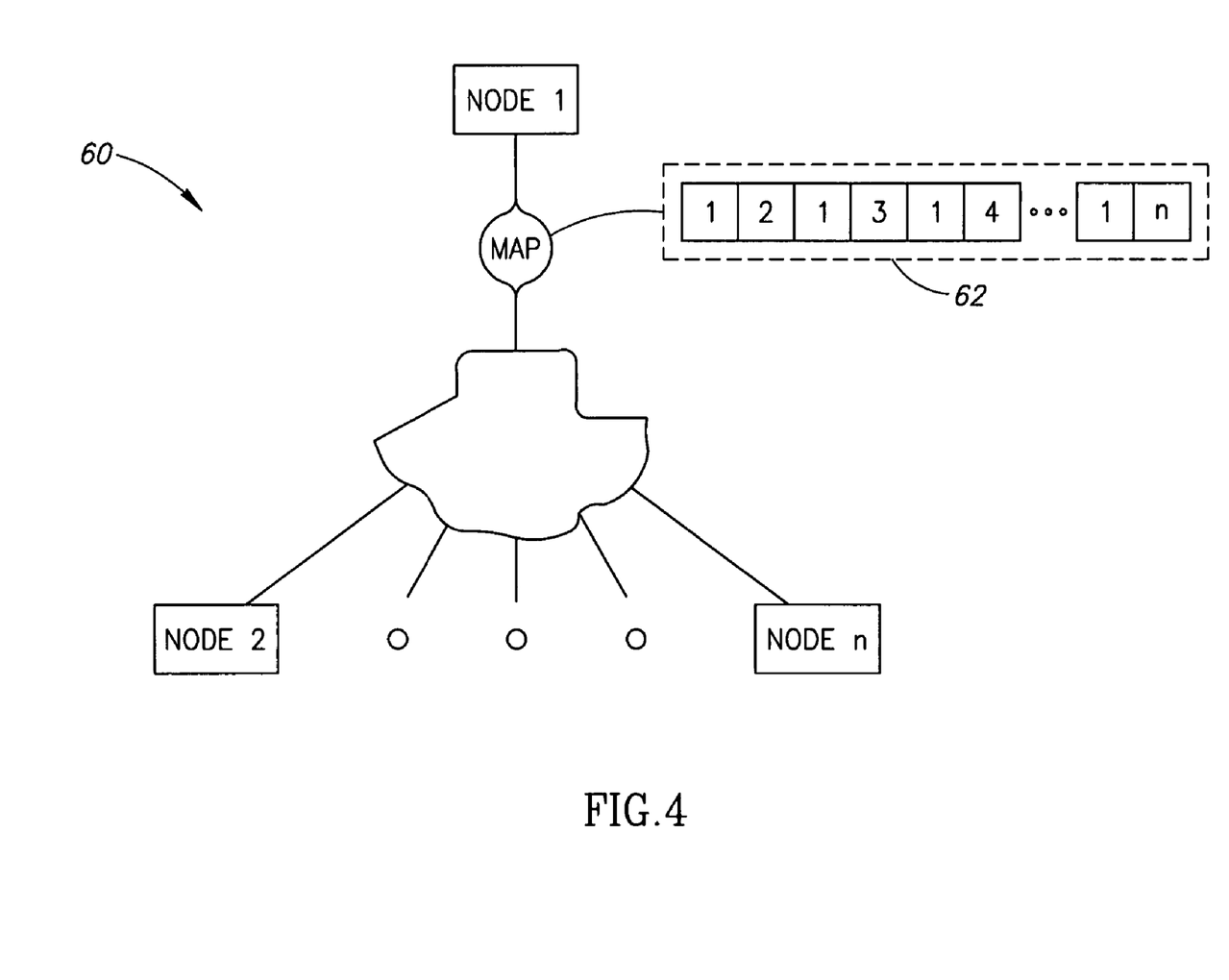
FIG. 4 is a schematic illustration of an additional exemplary data network, constructed and operative in accordance with an additional preferred embodiment of the present invention.

An additional preferred embodiment of the present invention is shown in FIG. 4, reference to which is now made. FIG. 4 shows an exemplary network 60 having n nodes. In contrast to networks 50 and 50' shown in FIGS. 2 and 3 (respectively), in which carrier sensing exists between all nodes on the network, in network 60, carrier sensing is only guaranteed to exist between node 1 and each of nodes 2 to n in network 60, but it is not guaranteed to exist between nodes 2 to n. An MDU/MTU (multi-dwelling unit/multi-tenant unit) network, which is known in the art, may typically have the network configuration shown in FIG. 4.

Applicant has realized that the robustness imparted to type 50' networks by the present invention, in the embodiment described with respect to FIG. 3, is accomplished by a solution working on the assumption that the carrier sensing between nodes is unreliable. Applicant has further realized that a solution which works without relying on carrier sensing between nodes when the carrier sensing may be unreliable, may also be implemented when the carrier sensing between nodes is known to be largely faulty or even non-existent, such as is the case in networks such as network 60 illustrated in FIG. 4.

In the additional preferred embodiment of the present invention illustrated in FIG. 4, communication may only be required between node 1 and each of nodes 2 to n on the network. Communication between nodes 2 to n may not be required. It will be appreciated that an additional advantage of network 60 shown in FIG. 4 with respect to networks 50 and 50' of FIGS. 2 and 3 is that deployment may not be limited by an attenuation limit which must be low enough in networks 50 and 50' to enable reception between all of the nodes. In network 60, attenuation must only be low enough between node 1 and the other nodes, which is easily achievable in coax networks.

In the additional preferred embodiment of the present invention illustrated in FIG. 4, node 1 may be the master, i.e., it may be the one node on the network, such as network device 41 shown in FIGS. 2 and 3, which comprises an SBS scheduler 24. Accordingly, node 1 may be the network device which creates and publishes the transmission cycle MAPs.

The MAP created and published by node 1 in accordance with an additional preferred embodiment of the present invention, and as shown in FIG. 4, may dictate a transmission opportunity schedule 62 in which every other sub-burst slot is assigned to node 1. Transmission opportunities may be provided to network nodes 2 to n in the alternate sub-burst slots not assigned to node 1, according to any suitable scheme, some of which are described in the above-mentioned U.S. patent application Ser. No. 11/218,708.

For example, node 1 may be the sole participant of a group 'j', while nodes 2 to n may be the participants of a group 'k'. A MAP dictating a suitable scheme for the additional preferred embodiment of the present invention described with respect to FIG. 4. May dictate a repetitive transmission opportunity schedule in which one sub-burst slot for group 'j' may be followed by one Next_Group opportunity 'N'. Each repetition scheduled according to this MAP may include one sub-burst slot for group 'j', (which will inevitably be assigned to node 1, the sole participant of a group 'j'), followed by one sub-burst slot for group 'k' which will be assigned in turn to each participant in group 'k'. The resultant transmission opportunity schedule may thus resemble transmission opportunity schedule 62 shown in FIG. 4, i.e., '1,2,1,3,1,4 . . . 1,n'.

Subsequent to the publication of the transmission cycle MAP, such as exemplary MAP 62, which does not allow any of nodes 2 to n to have a transmission opportunity without that transmission opportunity being preceded by a transmission from the master (node 1), transmissions may occur over network 60 in a manner similar to that described with respect to FIG. 3. That is, during each sub-burst slot assigned to node 1, node 1 may transmit a SCMAP, such as SCMAP 36 shown in FIG. 3. As in the method described with respect to FIG. 3, the listening nodes (nodes 2 to n) may extract SCMAP 36 and proceed to use it as the current transmission opportunities schedule. Because an SCMAP 36 may be transmitted before every transmission opportunity allowed to nodes 2 to n (in accordance with MAP 62), synchronization of nodes 2 to n with node 1, and consequently with each other, may thus be assured. Desynchronization events and their concomitant packet errors may thereby be minimized.

The present invention may also be implemented for networks with other types of connectivity. For example, there may be networks in which some of the nodes have connectivity with all the nodes and others do not. Alternatively, there may be no nodes with connectivity with everyone.

Figure 6:
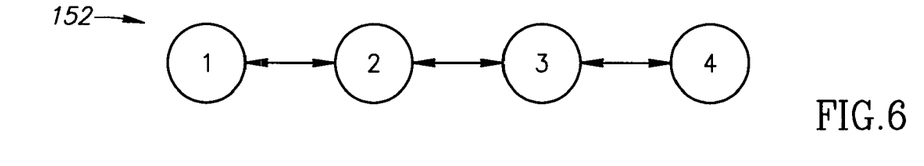
FIG. 6 is a schematic illustration of an exemplary set of nodes in a network.
Figure 7:
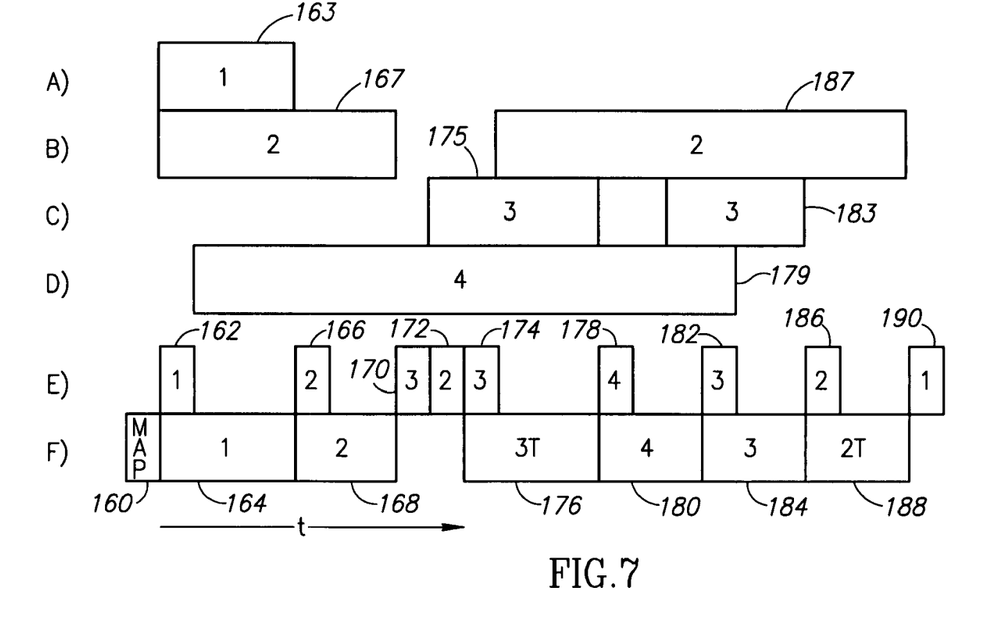
FIG. 7 is a timing diagram of an exemplary set of data and token transmissions, useful in understanding the operation of the networks of FIGS. 5 and 6.

In the next embodiment, a sub-burst-slot transmission opportunity may be available only after an actual transmission from predefined nodes or of predefined information in a transmission. For example, there may be a network where nodes 1 and 2 have connectivity with all the other nodes but nodes 3, 4 and 5 do not. For this example, scheduling a sequence of 1,2,3,1,4,2,5 may be possible but may require that nodes 3, 4 and 5 only transmit after detecting a transmission from nodes 1 or 2. Each node may be required to determine which node transmitted (as in the embodiment of FIG. 2) before transmitting and nodes 3, 4 and 5 may be authorized to transmit only after detection of a transmission from nodes 1 or 2. Alternatively, as illustrated in FIGS. 5-7, the less connected nodes (e.g. nodes 3, 4 and 5) may only be required to detect the transmission of a token 80.

Figure 5:
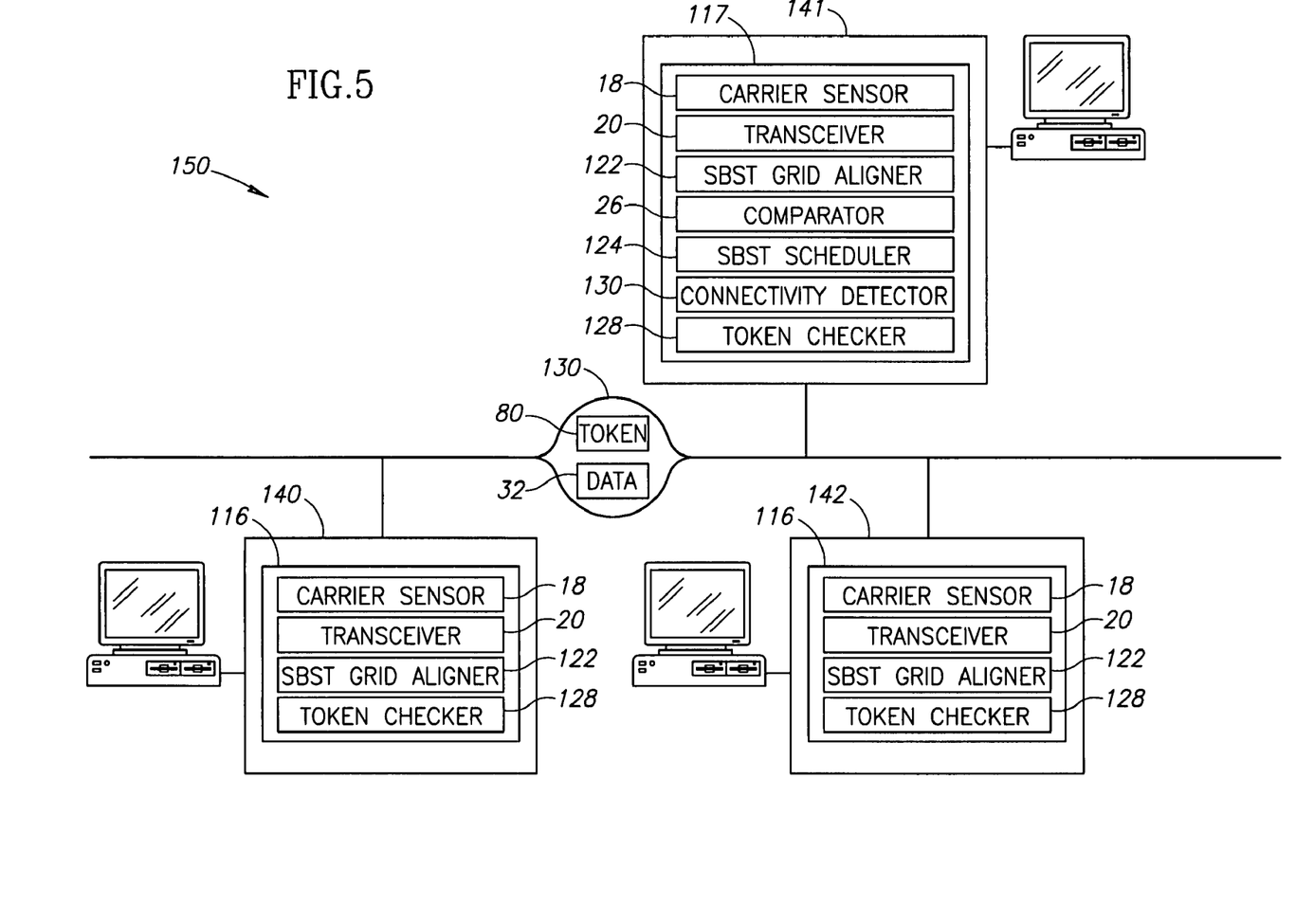
FIG. 5 is a schematic illustration of a further exemplary network capable of passing a token, constructed and operative in accordance with a preferred embodiment of the present invention.

Reference is now made to FIG. 5, which illustrates an alternative embodiment of the present invention that passes token 80 as part of a transmission 130 of data 32, from relatively well-connected nodes to indicate to relatively less-connected nodes that the medium is available to them. Reference is also made to FIG. 6, which illustrates an exemplary network configuration, and to FIG. 7, which illustrates its operation for the network configuration of FIG. 6.

FIG. 5 shows an exemplary network 150, which is similar to network 50 of FIG. 2. Network 150 comprises network devices 140, 141 and 142 which are similar to network devices 40, 41 and 42, respectively, of network 50.

Like network devices 40 and 42 which each comprise a modem 16, network devices 140 and 142 each comprise a modem 116 which is similar to modem 16 of FIG. 2. Both modems 16 (FIG. 2) and 116 (FIG. 5) comprise a carrier sensor 18 and a transceiver 20. However, modems 116 (FIG. 5) comprise an alternative sub-burst slot and token (SBST) grid aligner 122 and a token checker 128. Similarly, modem 117 of network device 141 (FIG. 5) additionally comprises sub-burst slot and token (SBST) scheduler 124, a token checker 128 and a connectivity detector 130. The operation of carrier sensors 18, transceivers 20, and sub-burst slot (SBS) grid aligners 22 in modems 116 and 117, are similar to their operation in modems 16 and 17 of FIG. 2.

FIG. 6 illustrates an exemplary network 152 of four nodes in a series. Node 1 may detect transmissions only from node 2, node 2 may detect transmissions from nodes 1 and 3, node 3 may detect transmissions from nodes 2 and 4 and node 4 may only detect transmissions from node 3.

Returning to FIG. 5, network device 141, which may be the master device and may be any of nodes 1-4, may initially utilize connectivity detector 130 to determine the configuration of network 152 (FIG. 6). Connectivity detector 130 may be any suitable connectivity detector which may implement any suitable connectivity detection protocol, such as TCP/IP routing protocols, Ethernet Spanning Tree protocol, etc., or any other protocol as are known in the art. For example, connectivity detector 130 may periodically poll each node to which it is connected, asking them which nodes they hear. Similarly, any node with a connectivity detector may poll its connected nodes to determine which nodes they hear. As a result, the master may determine the entire connectivity of the network.

With the connectivity information, SBST scheduler 124 may schedule a MAP for network 152, in the manner described hereinabove for SBS scheduler 24. In addition, SBST scheduler 124 may indicate to each node whether it must transmit token 80 as part of its transmissions or detect token 80 in order to begin its transmissions or both. Typically, the better-connected nodes may transmit without detecting a token while the less-connected nodes may not transmit unless they detect token 80 from one of the better-connected nodes.

For network 152 (FIG. 6), SBST scheduler 124 may have generated the following transmission instructions:

Node 1: may utilize a sub-burst slot assigned to it if the sub-burst slot is right after the transmission of the MAP or if the previous transmission 130 included token 80;

Node 2: may utilize a sub-burst slot assigned to it only if the previous transmission 130 does not include token 80;

Node 3: may utilize a sub-burst slot assigned to it only if the previous transmission 130 does not include token 80; and Node 4: may utilize a sub-burst slot assigned to it if the previous transmission 130 included token 80.

Each token checker 128 of network devices 140, 141 and 142 may determine the presence or lack thereof in transmissions 130 and may provide its results to its associated SBST grid aligner 122. SBST grid aligners 122 may determine whether or not transmission is allowed for its network device, based on its transmission instructions in the MAP. Thus, SBST grid aligners 122 for nodes 1 and 4 of network 152 may enable their transceiver 20 to transmit, if there is data, if it is their sub-burst slot and if they received token 80, while SBST grid aligners 122 for nodes 2 and 3 may indicate to their transceivers 20 to transmit if there is data, if it is their sub-burst slot and if the previous transmission 130 does not include token 80.

FIG. 7 illustrates one transmission scenario over time. Sections A-D indicate when transceivers 20 of nodes 1-4 have data to transmit, section E provides the MAP schedule and section F indicates the transmissions on the network medium.

Initially, there is a transmission 160 of the MAP. Node 1 is assigned the next sub-burst slot, labeled 162, and, since there is data 163 to be transmitted and it is after the transmission of MAP 160, node 1 transmits its transmission 164. Node 2 is assigned the next sub-burst slot, labeled 166. Since there is data 167 to be transmitted and since it is after a non-token transmission, node 2 transmits its transmission 168. At this point, node 1, which cannot detect the transmissions of nodes 3 and 4, cannot take over the medium since node 2 transmitted without a token. However, node 3, which has the next sub-burst slot 170, can transmit. At this point, node 3 has nothing to transmit so it does not utilize sub-burst slot 170. Node 2, which has the next sub-burst slot 172, also has nothing to transmit.

For sub-burst slot 174, assigned to node 3, node 3 has data 175 to transmit, so it utilizes sub-burst slot 174. Since the next sub-burst slot is assigned to node 4, node 3 transmits token 80 as part of its transmission 176, which flags node 4 to use its assigned next sub-burst slot 178. Node 4 has data 179 to transmit so it utilizes sub-burst slot 178 with a transmission 180. Node 3, assigned to the next sub-burst slot 182, has more data 183 to transmit, which it transmits during its transmission 184. Note that transmission 184 is a non-token transmission, which enables only node 2, which has the next sub-burst slot 186, to transmit after it. Node 2 utilizes sub-burst slot 186 to transmit its data 187. The transmission 188 includes a token, to pass the medium over to node 1.

It will be appreciated that, in this embodiment, less-connected nodes, such as nodes 1 and 4 in FIG. 7, may transmit only when so indicated by the better-connected nodes. This may ensure that the less-connected nodes do not transmit at the same time that other nodes, which the less-connected nodes cannot detect, are transmitting.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:

providing transmission opportunity synchronization information from a transmitting network device transmitting data on a communications medium to other network devices attempting to follow the same transmission opportunities schedule as said transmitting network device, wherein said synchronization information is a self-calculated media access plan (SCMAP), having a plurality of transmission opportunity slots therein, said slots being shifted by the duration of said data transmission to incorporate the expansion of the slot associated with said data transmission.

2. A method comprising:

providing transmission opportunity synchronization information from a transmitting network device to other network devices attempting to follow the same transmission opportunities schedule as said transmitting network device, wherein said transmitting network device and said other network devices form a multidwelling unit multi-tenant unit network and comprising:

utilizing a MAP having alternate transmission opportunities allocated to better-connected network devices and remaining transmission opportunities allocated among the less-well connected network devices of said network.

3. The method according to claim 2 and comprising, for said less well-connected network devices, transmitting during allocated transmission opportunities after detection of a specific transmission.

4. The method according to claim 3 and wherein said specific transmission is a token.

5. A network device comprising:

a transceiver to transmit and receive data and transmission opportunity synchronization information on a communications medium; and means to utilize said received transmission opportunity synchronization information from another network device to adhere to the same transmission opportunities schedule as said another network device, wherein said synchronization information is a self-calculated media access plan (SCMAP), having a plurality of transmission opportunity slots therein, said slots being shifted by the duration of said data transmission to incorporate the expansion of the slot associated with said data transmission.

6. A network device according to claim 5 and wherein said means comprises an extractor to extract said SCMAP for use as a current transmission opportunities schedule.

7. A method comprising:

transmitting transmission opportunity synchronization information with a data packet from a transmitting network device on a communications medium, wherein said synchronization information is an SCMAP calculated by said network device, and wherein said SCMAP has a plurality of transmission opportunity slots therein, said slots being shifted by the duration of said data transmission to incorporate the expansion of the slot associated with said data transmission.

\* \* \* \* \*